United States Patent [19]
Coellner et al.

[11] Patent Number: 5,448,895
[45] Date of Patent: Sep. 12, 1995

[54] HYBRID HEAT PUMP AND DESICCANT SPACE CONDITIONING SYSTEM AND CONTROL METHOD

[75] Inventors: James A. Coellner, Philadelphia, Pa.; Dean S. Calton, Vincenttown, N.J.

[73] Assignee: Engelhard/ICC, Philadelphia, Pa.

[21] Appl. No.: 2,427

[22] Filed: Jan. 8, 1993

[51] Int. Cl.$^6$ .................. F25D 17/06; F25D 23/00
[52] U.S. Cl. ........................................ 62/94; 62/271
[58] Field of Search .................... 62/94, 271, 238.3

[56] References Cited
U.S. PATENT DOCUMENTS

| | | | |
|---|---|---|---|
| 2,968,165 | 1/1961 | Norback | 62/94 |
| 4,474,021 | 10/1984 | Harband | 62/271 X |
| 4,887,438 | 12/1989 | Meckler | 62/271 |

*Primary Examiner*—William E. Wayner
*Attorney, Agent, or Firm*—Panitch Schwarze Jacobs & Nadel

[57] ABSTRACT

An energy-efficient space conditioning system comprising an integrated direct expansion heat pump with desiccant and thermal exchange wheels. A method is disclosed for controlling the system to have four distinct modes of operation: Heating, Cooling/Regneration, Coil Defrost, and Regeneration.

14 Claims, 1 Drawing Sheet

HYBRID HEAT PUMP AND DESICCANT SPACE CONDITIONING SYSTEM AND CONTROL METHOD

BACKGROUND OF THE INVENTION

Electric heat pumps have become common means for heating and cooling indoor spaces. Such units typically employ direct expansion of refrigerants such as CFCs and HCFCs. They typically position a compressor and condensor coil in the ambient environment, where the condensor may be exposed to ambient air, usually by use of a fan. The other component of the system comprises an evaporator coil which is positioned in the indoor space, and which transfers heat to and from the indoor air circulated over the coil. As is well known in the art of heating and refrigeration, the heat pump heats indoor spaces by transfering sensible heat from the ambient atmosphere to the indoor air, while when desired, it cools indoor spaces by transfering heat from the indoor air to the ambient (in the same manner as a conventional air conditioner. Typical heat pumps also employ a resistive heating coil for supplementation of the heating function when ambient temperatures are too low to permit the desired heating.

Regenerative type periodic flow devices are conventionally employed for the transfer of heat or a material from one fluid stream to another, and thereby from one area or zone in space to another. Typically, a sorptive mass is used to collect heat or a particular mass component from one fluid stream which flows over or through that mass. The flowing fluid is rendered either cooler (in the case of heat sorption) or less concentrated (in the case of, for instance, adsorption of particular gases). The sorptive mass is then taken "off-stream" and regenerated by exposure to a second fluid stream which is capable of accepting the heat or material desorbed with favorable energetics.

In some applications continuous flow systems are used, where the sorptive media itself is moved between two or more flowing fluid streams. The most common construction employed for such systems is a porous disk, often referred to as a wheel or rotor. In its simplest form, such a wheel is divided into two flow zones, and fluid is passed over the sorptive surface of the wheel (typically flowing through the thickness of the disc parallel to the rotational axis of the cylinder) as the wheel is rotated to carry the sorptive material from one zone, into the other, and back again to complete a revolution. In a heat exchanger wheel, for instance, one zone of warm fluid and one zone of cooler fluid are present. Heat is adsorbed by the material of the wheel in the warm flow zone, and is carried away from the wheel as the sorptive material passes through the cool flow zone.

BRIEF DESCRIPTION OF THE INVENTION

The system and method of the present invention comprises a space conditioning system based upon an integrated direct expansion heat pump with desiccant wheel and heat exchange (thermal) wheel. The system is controlled to have four distinct modes of operation: Heating, Cooling/Regneration, Coil Defrost, and Regeneration. Three evaporator/condensor coils are employed, and these are controlled with pairs of solenoid operated diverter valves capable of directing refrigerant flows.

In the preferred embodiment of the present invention, an integrated heat pump desiccant/water vapor exchange system for providing temperature conditioned air to an enclosed space (the "conditioned space") such as a supermarket or shopping mall is comprised of desiccant/water vapor exchangers (which are preferably multi-wheel systems), coupled with direct expansion heat pump apparatus which provides both cooling, as well as a source of heat energy for use in regeneration of the desiccant medium. A mixed-component refrigerant is employed which provides larger ranges of operating conditions in the heat pump part of the system.

DETAILED DESCRIPTION OF THE INVENTION

Figure 1:
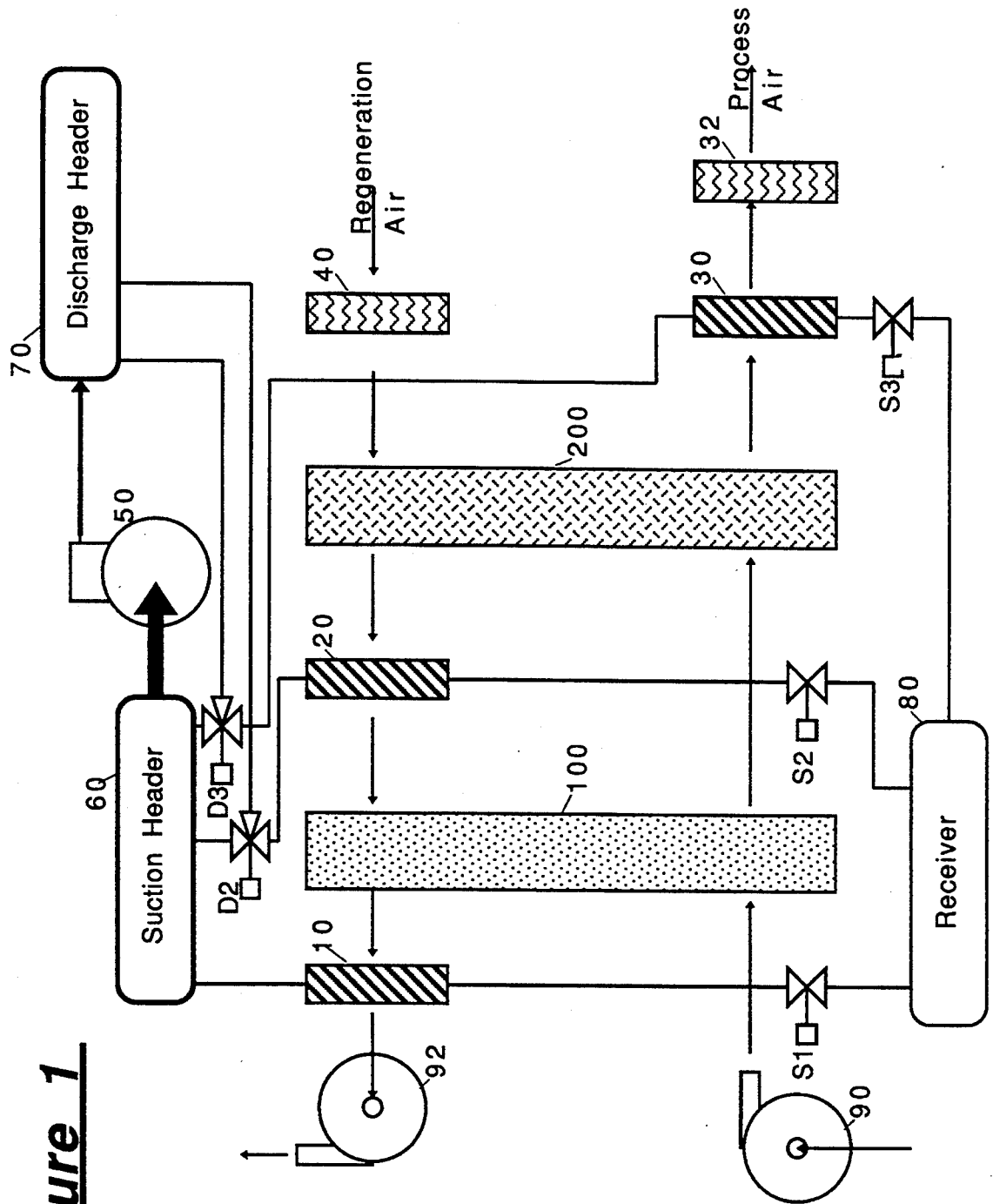
FIG. 1 depicts a schematic representation of an integrated heat pump desiccant/water vapor exchange space conditioning system of the present invention.

Referring now to FIG. 1 there is shown in schematic form a multi wheel desiccant/water vapor exchange system integrated into a heat pump, which may be controlled according to the present invention. Two air flow paths are defined through the system, one of which is air taken from an enclosed conditioned space. This air stream will typically contain large amounts of water vapor and will be warmer than the desired temperature at which the conditioned space is to be maintained. In a supermarket, for instance, evaoporation of water from goods, and exhaled and perspired moisture contribute to high humidity. Operation of refrigeration equipment, lights, and other machinery, as well as heat given off by humans and heating from insolation raise the temperature as well.

Typical direct expansion types of space conditioning systems use evaporator coils to both condense moisture from the air stream (the latent load), and to cool the airstream (the sensible load). Such systems typically use chlorofluorocarbon (CFC) refrigerants which are now known to be harmful to the environment. There have also been employed desiccant systems which first adsorb water vapor from the air stream using an inorganic material with a high K value for more hydrated states. After adsorption of water vapor (an exothermic process which yields dry, but extremely hot air), a cooling step is required which may be carried out using a heat exchanger to recover the thermal energy and recycle it for us in regenerating the desiccant by heating to drive off adsorbed water. The present invention combines these two approaches to yield a highly efficient system which is capable of heating, cooling, and dehumidifying an enclosed space.

Compressor 50 which is typically driven by an electric motor (not shown), serves to compress gaseous refrigerant which has absorbed heat from an air stream. Coils 10, 20, and 30 may either be evaporation coils in which a liquid refrigerant is allowed to expand (thereby absorbing heat from the ambient surrounding the coil), or in which a compressed stream of high temperature refrigerant is allowed to condense to a liquid (thus liberating heat which is transferred to the ambient surrounding the coil).

The coil 20, through which regeneration, or ambient air, is passed, will be denoted herein as the outdoor coil. The coil 30, through which process air passes before being delivered into the conditioned space, will be denoted herein as the indoor coil. The coil 10, which serves to reclaim heat, will be denoted as the reclaim coil. The state of coils 10, 20 and 30 is controlled by a first diverter valve D2 and a second diverter valve D3, where both the first and second diverter valves are solenoid operated, and a first valve S1, a second valve S2 and a third valve S3, where the first, second and third valves are solenoid operated. The reclaim coil 10 has a first side 10a in fluid communication with suction header 60, and a second side 10b in fluid communication with receiver 80. The outdoor coil 20 has a first side 20a in fluid communication with suction header 60 and discharge header 70, and a second side 20b in fluid communication with receiver 80. The indoor coil 30 has a first side 30a in fluid communication with suction header 60 and discharge header 70, and a second side 30b in fluid communication with receiver 80. Each diverter valve is interposed between a coil and flow lines in communication with suction header 60 and discharge header 70.

In operation, suction header 60 contains relatively cool (40° F. SST) gaseous R-22 refrigerant under low pressure (70 PSIG) which has absorbed heat from the ambient surrounding one or more coils. Discharge header 70 contains relatively hot (130° F. SST) gaseous refrigerant under high pressure (296 PSIG). Receiver 80, which is connected to each coil through an associated solenoid operated valve, typically contains relatively cool liquid refrigerant at high pressure.

In the cooling and dehumidification mode of the present invention, process air (that taken from the indoor space to be conditioned, and which contains both sensible heat and relatively high levels of water vapor) is first directed to a desiccant wheel 100, from which it exits at a temperature of approximately 110° F. and a moisture content of 20 gr/lb. This air stream is then directed to a heat exchange wheel 200, from which it exits at a relatively cool 85° F. This cool, dry air stream is then directed to a direct expansion coil 30, which further cools the air stream to the desired level (typically 65° F.). This air is then returned to the indoor space, or it may be directed to rehumidification means 32 to add moisture to be supplied to the conditioned space.

Regeneration air (from the ambient and typically at 100° F.) is optionally cooled by exposure to a water vapor phase-change cooling means to approximately 78° F. It is then exposed to thermal wheel 200 which carries heat, and the regeneration air absorbs this heat and is raised to approximately 105° F. The air stream is then exposed to coil 20, which heats the air still further (coil 20 functions as a condensor coil by allowing discharge refrigerant to liberate heat, thereby changing state to a liquid). This 140° F. air is then directed through desiccant wheel 100 to heat the desiccant, thereby regenerating the desiccant by driving off adsorbed water. The heat remaining in this air stream (which typically exits the desiccant wheel at 110° F.) may then be reclaimed by use of coil 10 as an evaporator, if desired, leaving the exhaust air stream at 90° F.

The states of the valves which control refrigerant flow in the system of the present invention are summarized in Table I.

TABLE I

| | Diverter Valve Position Settings | | | |
|---|---|---|---|---|
| | Dehumidify | Dehumidify /Cool | Heat | Defrost |
| D2 | On | On | Off | On |
| D3 | Off | Off | On | On |
| S1 | Modulated | Modulated | Off | Modulated |
| S2 | On | On | Modulated | On |
| S3 | Off | Modulated | On | Off |

Optionally, the system and method of the present invention may also control other ancillary systems such as post-conditioning systems, cogeneration systems, air flow controllers, and the like to provide an optimum solution for a multivariable system such as optimization of total energy consumption, within predetermined limits of conditioned space temperature and humidity, or the optimization of conditioned space "humiture" (the physiologically perceived temperature) within predetermined limits of energy consumption.

The system of the present invention may be implemented as a software/hardware system employing a general purpose digital microprocessor such as a Motorola 68030 (optionally used as part of a general purpose computer system, or with such peripheral circuits and interfaces as may be necessary to provide the required signals and storage.) Of course, those skilled in the art will recognize that while the present invention has been described with reference to specific embodiments and applications, the scope of the invention is to be determined solely with reference to the appended claims.

STATEMENT OF INDUSTRIAL UTILITY

The system and method of the present invention may be used in the operation and control of a space conditioning system.

We claim as our invention:

1. A heat pump and desiccant space conditioning system which operates on process air taken from conditioned space, and regenerative air taken from ambient space comprising:
   (a) means for converting a gaseous refrigerant at a first predefined temperature and pressure to a liquid refrigerant at a second predefined temperature and pressure;
   (b) means for adsorbing water vapor from process air;
   (c) means for transferring sensible heat from process air to regenerative air;
   (d) means for one of heating and cooling process air and for both heating and cooling regenerative air by phase change of a refrigerant; and
   (e) control means for directing said refrigerant to one of said heating and cooling means in response to control signals.

2. A heat pump and desiccant space conditioning system comprising:
   first means for passing process air from an enclosed and conditioned space through a first zone of a rotatable desiccant wheel and then through a first zone of a rotatable heat exchange wheel and then through an indoor coil back to the enclosed and conditioned space;
   second means for passing regenerative air from an ambient space through a second zone of said heat exchange wheel and then through an outdoor coil and then through a second zone of said desiccant wheel and then through a reclaim coil back to the ambient space a compressor having a suction side in fluid communication with a first side of each of said reclaim coil, said outdoor coil and said indoor coil and a discharge side in fluid communication with said first side of said outdoor coil and said indoor coil; and
a refrigerant receiver in fluid communication with a second side of each of said reclaim coil, outdoor coil and indoor coil.

3. The heat pump and desiccant space conditioning system of claim 2 further comprising a first valve between the second side of the reclaim coil and the receiver, a second valve between the second side of the outdoor coil and the receiver, and a third valve between the second side of the indoor coil and the receiver.

4. The heat pump and desiccant space conditioning system of claim 3 further comprising a first diverter valve for selectively fluidly coupling the first side of said outdoor coil with either one of the suction side or discharge side of the compressor.

5. The heat pump and desiccant space conditioning system of claim 4 further comprising a second diverter valve for selectively fluidly coupling the first side of said indoor coil with either one of the suction side or discharge side of the compressor.

6. A method of operating the heat pump and desiccant space conditioning system of claim 2 for dehumidifying the enclosed space comprising the steps of: rotating the desiccant wheel while operating the compressor to pass refrigerant through the compressor, and the outdoor coil to the receiver and from the receiver through the reclaim coil back to the compressor.

7. A method according to claim 6 further comprising the step of rotating the heat exchange wheel while rotating the desiccant wheel and operating the compressor.

8. A method of operating the heat pump and desiccant space conditioning system of claim 2 for simultaneously dehumidifying and cooling air in the enclosed space comprising the steps of: rotating both the desiccant wheel and the heat exchange wheel while operating the compressor to pass refrigerant through the compressor and the outdoor coil to the receiver and from the receiver through the indoor coil back to the compressor.

9. A method of operating the heat pump and desiccant space conditioning system of claim 2 for heating air in the enclosed space comprising the steps of: maintaining the desiccant wheel and the heat exchange wheels static while operating the compressor to pass refrigerant through the compressor and the indoor coil to the receiver and from the receiver through the outdoor coil and back through the compressor.

10. A method of operating the heat pump and desiccant space conditioning system of claim 2 for defrosting the outdoor coil comprising the steps of operating the compressor to pass refrigerant from the compressor through the outdoor coil and into the receiver, and from the receiver through the reclaim coil and back to the compressor.

11. A method of using a heat pump and desiccant space conditioning system of claim 5 for dehumidifying air in the enclosed space comprising the steps of:
configuring the first valve, the second valve and the first diverter valve to allow refrigerant to flow from the receiver through the first valve, the reclaim coil, the compressor, the first diverter valve, the outdoor coil, the second valve and back to the receiver while configuring the third valve and second diverter valve to prevent refrigerant from flowing therethrough; and
operating the compressor while rotating the desiccant wheel and maintaining the configuration of the valves.

12. A method of using a heat pump and desiccant space conditioning system of claim 5 for dehumidifying and cooling air in the enclosed space comprising the steps of:
determining a desired cool temperature for the enclosed space;
configuring the second valve and the first diverter valve to allow refrigerant flow through the compressor, the first diverter valve, the outdoor coil, the second valve and into the receiver;
simultaneously configuring the third valve and the second diverter valve to allow a sufficient portion of refrigerant in the receiver to flow through the third valve and the indoor coil to provide cooling of the process air to the desired cool temperature, and to pass the sufficient portion of the refrigerant through the second diverter valve to the suction side of the compressor; and
simultaneously configuring the first valve to allow refrigerant to flow from the receiver through the first valve and the reclaim coil to the suction side of the compressor; and
operating the compressor while maintaining the valve configurations and rotating both the desiccant wheel and the heat exchange wheel.

13. A method of using the heat pump and desiccant space conditioning system of claim 5 for heating air in the enclosed and conditioned space comprising the steps of:
determining a desired warm temperature for the enclosed and conditioned space;
configuring the third valve and the second diverter valve so that refrigerant flows through the compressor, the second diverter valve, the indoor coil, and the third valve into the receiver; and
simultaneously configuring the first diverter valve and the second valve so that refrigerant also flows from the receiver through the second valve, the outdoor coil and the first diverter valve to the suction side of the compressor; and
maintaining the configurations of the valves while operating the compressor and maintaining the desiccant wheel and the heat exchange wheel static.

14. A method of using the heat pump and desiccant space conditioning system of claim 5 for defrosting the outdoor coil comprising the steps of:
configuring the first valve so that refrigerant flows from the receiver through the first valve, the reclaim coil to the suction side of the compressor; and
simultaneously configuring the first diverter valve and the second valve so that refrigerant flows through the compressor, the first diverter valve, the outdoor coil and the second valve into the receiver; and
operating the compressor while maintaining the valve configurations.

* * * * *